(12) United States Patent  
Ramsey

(10) Patent No.: US 11,123,857 B1
(45) Date of Patent: Sep. 21, 2021

(54) EXTENSION POLE

(71) Applicant: Mark C. Ramsey, Omaha, NE (US)

(72) Inventor: Mark C. Ramsey, Omaha, NE (US)

(*) Notice: Subject to any disclaimer, the term of this patent is extended or adjusted under 35 U.S.C. 154(b) by 0 days.

(21) Appl. No.: 16/927,208

(22) Filed: Jul. 13, 2020

(51) Int. Cl.
F16B 7/04 (2006.01)
B25G 1/04 (2006.01)
F16F 1/18 (2006.01)

(52) U.S. Cl.
CPC ............... B25G 1/04 (2013.01); F16B 7/042 (2013.01); F16F 1/187 (2013.01)

(58) Field of Classification Search
CPC .................................. F16B 7/042; B25G 1/04
See application file for complete search history.

(56) References Cited

U.S. PATENT DOCUMENTS

| | | | | |
|---|---|---|---|---|
| 3,882,569 A * | 5/1975 | Vanderveer | ............ | F16B 7/0433 16/427 |
| 4,181,230 A * | 1/1980 | Acuff | ........................ | A47F 5/13 211/183 |
| 4,247,216 A * | 1/1981 | Pansini | ..................... | B25G 3/18 15/1.7 |
| 5,301,378 A * | 4/1994 | Schultz | ..................... | B25F 1/00 7/158 |
| 5,343,587 A * | 9/1994 | Findley | ................... | A47L 13/24 15/144.4 |
| 5,495,896 A * | 3/1996 | Bojar | ........................ | A01B 1/06 172/372 |
| 5,667,329 A * | 9/1997 | Yoder, Jr. | ................. | A47C 4/02 285/317 |
| 5,779,386 A * | 7/1998 | Eichhorn | ............. | A47D 13/105 403/109.3 |
| 7,334,957 B2 * | 2/2008 | Sadinsky | ............ | E04H 12/2269 403/109.3 |
| 7,416,361 B1 * | 8/2008 | Ostrobrod | .............. | A46B 5/002 15/144.3 |
| 7,896,398 B2 * | 3/2011 | Suda | ........................ | B25G 3/10 285/7 |
| 8,882,166 B2 | 11/2014 | Ramsey | | |
| 9,009,920 B1 | 4/2015 | Ramsey | | |
| 9,009,921 B1 | 4/2015 | Ramsey | | |
| 10,188,200 B1 * | 1/2019 | Hetzner | ................ | E04H 4/1609 |
| 2003/0007830 A1 * | 1/2003 | Bang | ....................... | F16B 7/042 403/327 |
| 2003/0135950 A1 * | 7/2003 | Dove | ....................... | B25G 3/26 15/230.11 |
| 2013/0234458 A1 * | 9/2013 | Wilkins | .................. | B25G 1/04 294/3.6 |
| 2016/0214251 A1 * | 7/2016 | Chalifoux | ............ | A46B 5/0095 |
| 2018/0015606 A1 * | 1/2018 | Kurani | ..................... | B25G 1/04 |

* cited by examiner

Primary Examiner — Jason W San
(74) Attorney, Agent, or Firm — Dennis L. Thomte; Thomte Patent Law Office LLC

(57) ABSTRACT

A collapsible extension pole comprised of extension pole members which are connected together in an end-to-end manner. The extension pole of this invention includes the use of spring clips to ensure that the extension pole members will not disconnect from one another during the use thereof.

4 Claims, 3 Drawing Sheets

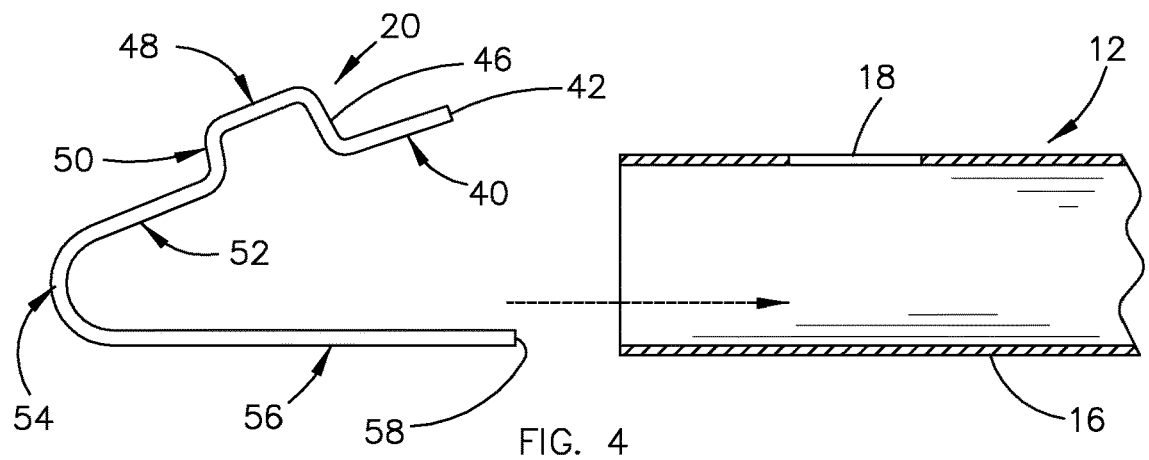
FIG. 4
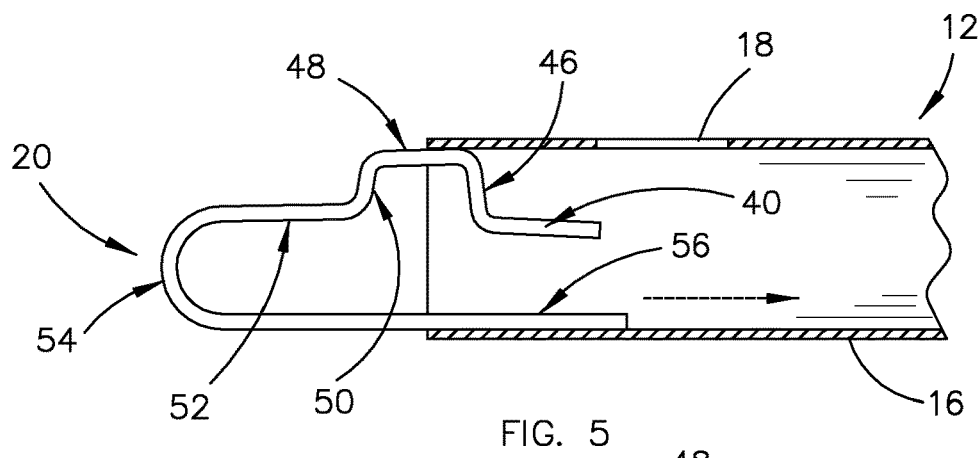
FIG. 5
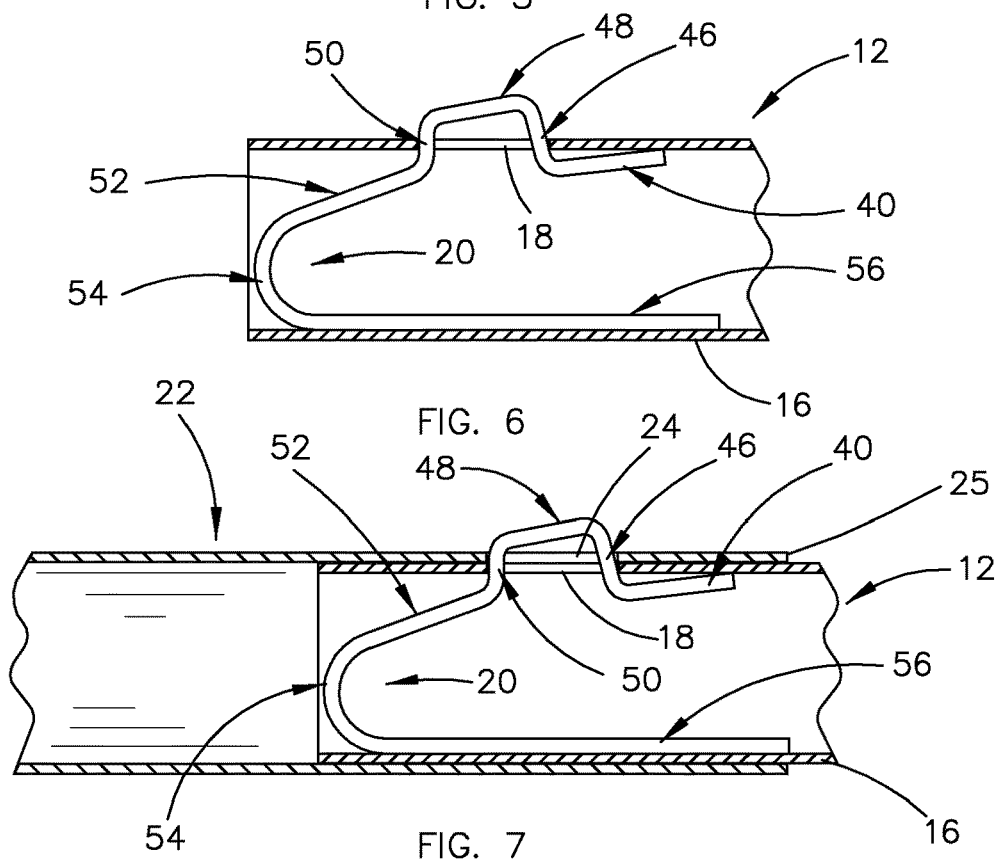
FIG. 6
FIG. 7

EXTENSION POLE

BACKGROUND OF THE INVENTION

Field of the Invention

This invention relates to an extension pole which is comprised of a plurality of pole members which are selectively connected together in an end-to-end manner. More particularly, this invention relates to a unique manner of securing the pole members together which prevents the separation of the pole members during the usage of the extension pole. A variety of different tools may be selectively secured to the outer end of the extension pole.

Description of the Related Art

Extension poles have long been used to enable a person to position a tool above a roof gutter or roof to enable debris such as leaves, etc., to be removed therefrom. The extension poles of the prior art normally were of one-piece construction which made it difficult to ship and then display the same at a store. Some extension poles have been comprised of a plurality of pole sections or members threadably secured together in an end-to-end manner by threaded connectors which increase the cost thereof. In some cases, the upper or outer ends of the extension pole could be inadvertently disconnected which resulted in an upper pole member of the extension pole becoming disconnected from the inner end of the pole.

In some of Applicant's earlier collapsible extension poles, the pole members were interconnected by a connector clip. However, under secure extension pressure applied to the extension pole, the connector clips thereof could fail thereby resulting in a separation of pole members of the extension pole.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A collapsible extension pole is described which is comprised of an elongated hollow and tubular inner handle member having an inner end and an outer end. The outer end of the handle member has an elongated reduced diameter portion having an elongated slot formed therein. A plurality of elongated and hollow tubular extension pole members, having inner and outer ends, are secured to the outer end of the handle member in an end-to-end manner. Each of the extension pole members have an inner end and an outer end. Each of the outer ends of the extension pole members has a reduced diameter portion. Each of the extension pole members have an elongated slot formed therein outwardly of the inner ends thereof. Each of the extension pole members have an elongated slot formed therein in the reduced diameter portion thereof. The outermost extension pole member has an externally threaded portion extending from the outer end thereof. A tool is secured to the externally threaded portion.

The extension pole of this invention is assembled by inserting one end of a first extension pole member onto the reduced diameter portion of the handle member so that the slots formed therein register with one another. Additional extension pole members are secured together in an end-to-end manner.

The inner end of the intermost extension pole member is secured to the reduced diameter portion at the outer end of the handle member by a spring clip which is positioned in the reduced diameter portion of the handle member so that the spring clip has a portion thereof extending through the registering slots in the handle member and the inner end of the adjacent extension pole member. The other extension pole members are connected together in the same manner.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 illustrates the spring clip of this invention about to be inserted into the reduced diameter portion of one of the pole members which is shown in section;

FIG. 5 illustrates the spring clip of this invention being inserted into the pole member of FIG. 4;

FIG. 6 illustrates the spring clip of this invention inserted into the pole member of FIG. 4; and FIG. 7 illustrates a pole member being inserted onto the spring clip and pole member of FIG. 6.

DESCRIPTION OF THE PREFERRED EMBODIMENT

Figure 1:
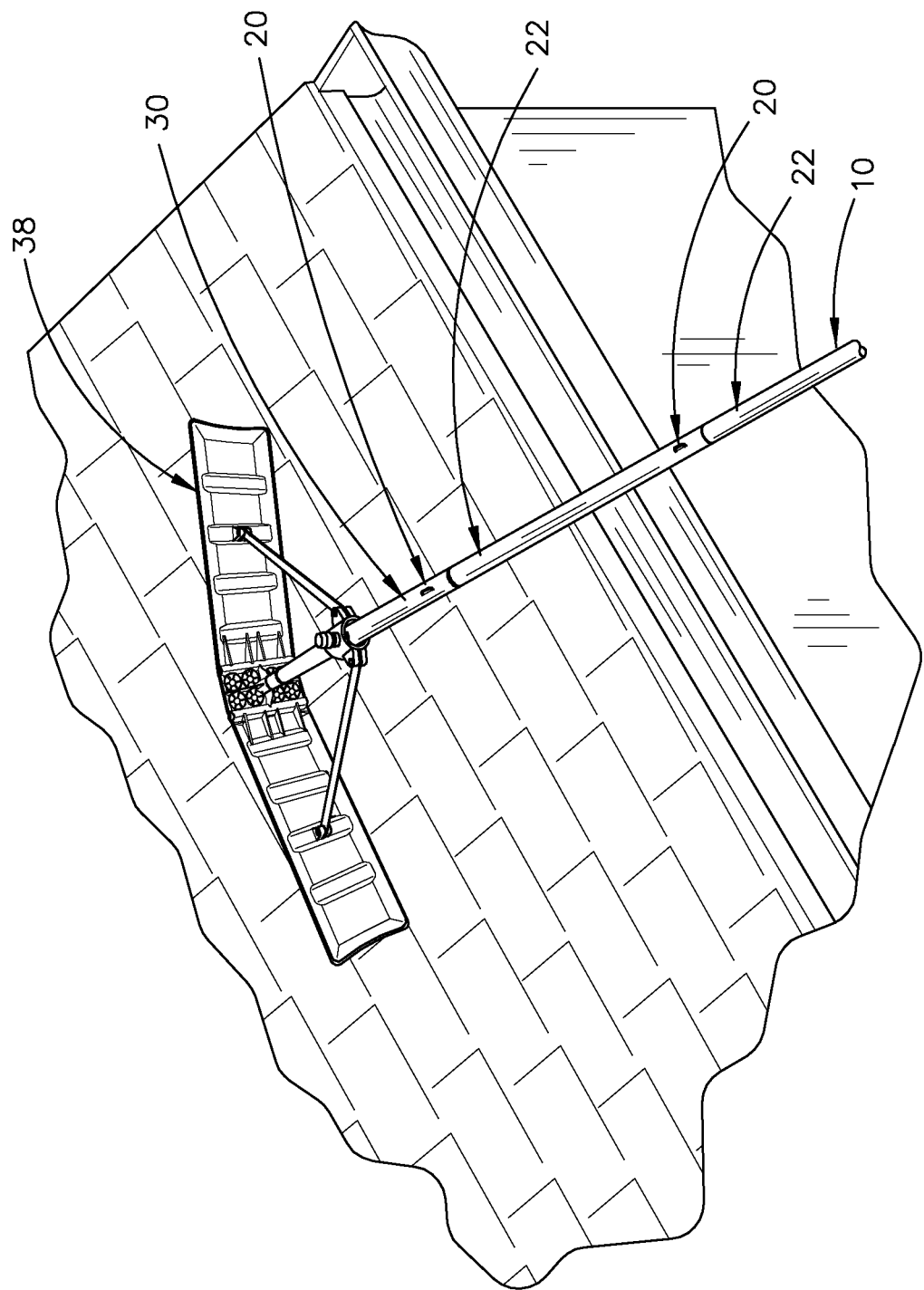
FIG. 1 is a partial perspective view of the extension pole of this invention with the outer end thereof having a tool mounted thereon.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The extension pole of this invention is designated by the reference numeral 10. Extension pole 10 is comprised of an elongated and hollow inner pole member 12 which has a handle or grip 14 mounted on the inner end thereof. Pole member 12 has a reduced diameter portion 16 at the outer end thereof. The reduced diameter portion 16 of pole member 12 has an elongated slot 18 formed therein. As will be described in detail hereinafter, a spring clip 20 is positioned in the reduced diameter portion 16 of pole member 12 with a portion thereof extending outwardly through slot 18.

The numeral 22 refers to elongated and hollow extension pole member 22, the number of which may vary depending on the desired length of the extension pole 10. Each of the pole members 22 has an elongated slot 24 formed therein at the inner end 25 thereof. Each of the pole members 22 has a reduced diameter portion 26 at the outer end thereof. Each of the reduced diameter portions 26 has an elongated slot 28 formed therein. A spring clip 20 is positioned in the reduced diameter portion 26 in each of the pole members 22. Extension pole 10 also includes an elongated outer pole member 30 having an inner end 32. An elongated slot 34 is formed in pole member 30 outwardly of end 32. An externally threaded connector 36 is secured to the outer end of pole member 30. Connector 36 may have a tool such as a roof rake secured thereto and other tools secured thereto such as a gutter cleaner, fruit picker, pruning saw and duster.

Figure 2:
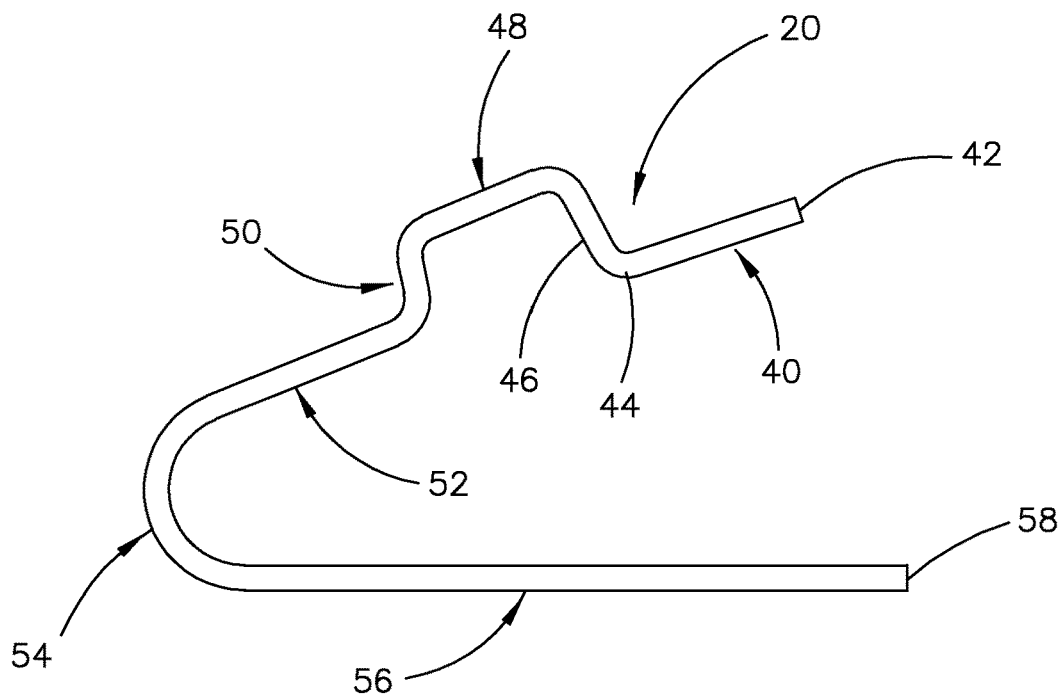
FIG. 2 is a side view of the spring clip which is used in the extension pole of this invention.
Figure 3:
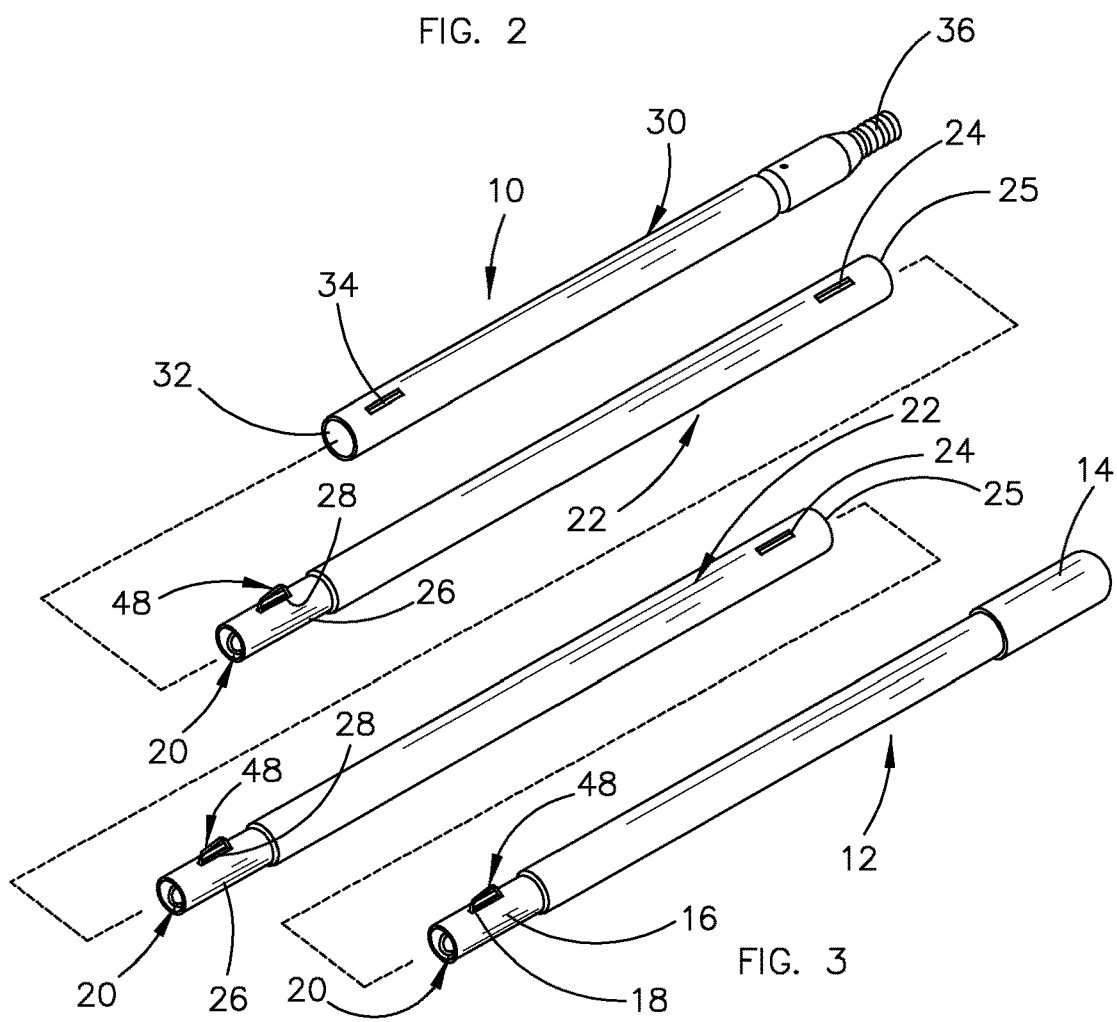
FIG. 3 is an exploded perspective view of the pole members of the extension pole of this invention.

Spring clip 20 will be described as being in the position of FIG. 2. In actual use, the spring clip 20 may be positioned in different positions. Spring clip 20 is comprised of a metal spring material and includes an elongated first leg member 40 having ends 42 and 44. Preferably, first leg member 40 has a length of approximately ⅝th inch. A second leg member 46 extends upwardly from end 44 of first leg member 40 at an approximate angle of 93 degrees and has a length of approximately 5/16th inch. A third leg member 48 extends from the upper end of leg member 46 at an approximate angle of 90 degrees and preferably has a length of approximately ⅝th inch. A fourth leg member 50 extends downwardly from leg member 48 at an angle of approximately 93 degrees and preferably has a length of approximately ¼th inch. A fifth leg member 52 extends from the lower end of leg member 50 at an angle of approximately 87 degrees. Leg member 52 has an approximate length of 1¼th inch. The numeral 54 refers to a generally U-shaped leg member which extends between the end of leg member 52 and the end of spring leg member 56 which has an end 58. Preferably, spring leg member 56 has a length of approximately 2¾th inch. The angle between leg members 52 and 56 is approximately 35 degrees.

Preferably pole member 12 has an approximate length of 22 inches. Preferably, each of the pole members 22 have a length of 22 inches. Preferably, pole member 30 has a length of 22 inches. The lengths of the pole members enables them to be inserted into a box or container for pallet shipment, for storage, and for display.

The extension pole 10 is assembled by slipping the end 25 of a pole member 22 onto the reduced diameter portion 16 of pole member 12. As end 25 of the pole member 22 is slipped onto the reduced diameter portion 16 of pole member 12, that portion of the spring clip 20 which protrudes outwardly through slot 18 will be depressed against the spring action of the leg member 56. When slot 24 of pole member 22 registers with slot 18 of pole member 12, the leg member 48 and a portion of leg members 46 and 50 will spring upwardly through the slot 24 to securely attach pole member 22 to pole member 12. The engagement of the leg members 48 and 50 with the ends of the slot 24 at almost a right angle will resist the separation of pole member 22 from pole member 12. When it is desired to disconnect pole member 22 from pole member 12, downward pressure is manually applied to leg member 48 so that leg member 48 is moved sufficiently downwardly out of slot 24 so that pole member 22 may be longitudinally separated from pole member 12.

The pole members 22 and 30 are similarly connected together to create the extension pole 10. When secured together as described above, the spring clips 20 ensure that the pole members will not inadvertently disconnect.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A tubular and collapsible extension pole, comprising:
an elongated tubular handle member having an inner end and an outer end;
an elongated tubular grip embracing said inner end of said tubular handle member;
said tubular handle member having an elongated reduced diameter portion at said outer end thereof;
said reduced diameter portion of said tubular handle member having a first elongated slot formed therein;
a spring clip positioned in said reduced diameter portion of said tubular handle member;
said spring clip having an inner end and an outer end;
said spring clip comprising:
 (a) an elongated first leg having inner and outer ends;
 (b) a second leg, having a first end and a second end, extending from said outer end of said first leg;
 (c) an elongated third leg, having an inner end and an outer end, extending outwardly from said second end of said second leg;
 (d) a fourth leg having a first end and a second end;
 (e) said fourth leg extending from said outer end of said third leg;
 (f) an elongated fifth leg having an inner end and an outer end, extending outwardly from said second end of said fourth leg;
 (g) a generally U-shaped sixth leg, having a first end and a second end, extending from said second end of said fifth leg;
 (h) an elongated spring leg, having an inner end and an outer end, extending inwardly from said second end of said U-shaped sixth leg;
the distance between said inner end of said first leg and said inner end of said spring leg being less than the inside diameter of said reduced diameter portion of said tubular handle member whereby said inner end of said spring leg engages the inner surface of said reduced diameter portion of said tubular handle member to yieldably urge said second, third and fourth legs extend into said first slot in said reduced diameter portion of said tubular handle member;
and at least one elongated tubular extension pole member, having an inner end and an outer end, selectively removably secured to reduced diameter portion of said tubular handle member;
said inner end of at least one elongated tubular extension pole member having the same diameter as said tubular handle member whereby said inner end of said at least one tubular extension pole member may receive said reduced diameter portion of said tubular handle member therein;
said at least one tubular extension pole member having an elongated slot formed therein at said inner end thereof which is aligned with said first elongated slot in said reduced diameter portion of said tubular handle member;
said second, third and fourth legs of said spring clip, which extend into said first slot in said reduced diameter portion of said tubular handle member, extending into said slot of said at least one tubular extension pole member to yieldably secure said at least one tubular extension pole member to said tubular handle member; and said at least one tubular extension pole member being disconnected from said tubular handle member by manually depressing said second, third and fourth legs of said spring clip from said slot of said at least one tubular extension pole member.

2. The tubular extension pole of claim 1 wherein the angle between said first and second legs is about 90 degrees and wherein the angle between said fourth and fifth legs is about 90 degrees.

3. The tubular extension pole of claim 1 wherein the angle between first leg and said spring leg is about 35 degrees.

4. A spring clip for securing inner and outer hollow extension pole members together, comprising:
   (a) with each of the inner and outer hollow extension pole members having an elongated slot formed therein with the slots being aligned with one another;
   (b) an elongated first leg having inner and outer ends;
   (c) a second leg, having a first end and a second end, extending from said outer end of said first leg;
   (d) a third leg, having an inner end and an outer end, extending outwardly from said second end of said second leg;
   (e) a fourth leg having a first end and a second end;
   (f) said fourth leg extending from said outer end of said third leg;
   (g) a fifth leg having an inner end and an outer end, extending outwardly from said second end of said fourth leg;
   (h) a generally U-shaped sixth leg, having a first end and a second end, extending from said second end of said fifth leg;
   (i) an elongated spring leg, having an inner end and an outer end, extending inwardly from said second end of said U-shaped sixth leg;
   (j) said second, third and fourth legs yieldably extending through the slot formed in the inner hollow extension pole member and the slot formed in the outer hollow extension pole member; and the distance between said first leg and said spring leg being less than the inside diameters of the inner and outer extension pole members.

\* \* \* \* \*